United States Patent
Schipper et al.

(10) Patent No.: US 8,641,121 B2
(45) Date of Patent: Feb. 4, 2014

(54) MOUNTING DEVICE FOR USE WITH PORTABLE ELECTRONIC INSTRUMENTS

(75) Inventors: Michael Jack Schipper, Murphy, TX (US); Max Alan Probasco, Plano, TX (US)

(73) Assignee: AirGizmos, LP, Richardson, TX (US)

( * ) Notice: Subject to any disclaimer, the term of this patent is extended or adjusted under 35 U.S.C. 154(b) by 444 days.

(21) Appl. No.: 11/437,886

(22) Filed: May 22, 2006

(65) Prior Publication Data

US 2007/0019387 A1    Jan. 25, 2007

Related U.S. Application Data

(60) Provisional application No. 60/701,689, filed on Jul. 22, 2005.

(51) Int. Cl.
*B60R 7/06* (2006.01)

(52) U.S. Cl.
USPC .................................... 296/37.12; 296/37.1

(58) Field of Classification Search
USPC .............. 248/346.01, 346.03, 346.04, 346.5; 248/309.1, 917, 918; 296/37.1–37.16; 297/188.01; 312/242, 235.5, 235.7; 108/280, 439
See application file for complete search history.

(56) References Cited

U.S. PATENT DOCUMENTS

| | | | | |
|---|---|---|---|---|
| 3,990,762 A * | 11/1976 | Lemesle | ...................... | 439/395 |
| 4,881,910 A * | 11/1989 | Odemer | ..................... | 439/476.1 |
| 5,510,957 A * | 4/1996 | Takagi | .......................... | 361/814 |
| 5,577,119 A * | 11/1996 | Giammanco | ................. | 379/438 |
| 5,626,320 A | 5/1997 | Burrell et al. | | |
| 5,633,782 A * | 5/1997 | Goodman et al. | ............. | 361/683 |
| 5,899,421 A * | 5/1999 | Silverman | ..................... | 248/175 |
| 5,996,956 A * | 12/1999 | Shawver | ..................... | 248/309.1 |
| 6,113,050 A * | 9/2000 | Rush | ........................ | 248/346.01 |
| 6,554,239 B2 * | 4/2003 | Stilley et al. | ................ | 248/309.1 |
| 6,598,845 B1 * | 7/2003 | Higgins | ..................... | 248/309.1 |
| 6,663,072 B1 * | 12/2003 | Ritchey et al. | ................ | 248/444 |
| 6,688,518 B1 * | 2/2004 | Valencia et al. | ............... | 235/379 |
| 6,788,528 B2 * | 9/2004 | Enners et al. | ............. | 361/679.41 |
| 7,261,270 B2 * | 8/2007 | Chen et al. | ............... | 248/346.03 |
| 7,667,968 B2 * | 2/2010 | Moorer et al. | ................ | 361/697 |
| 8,083,038 B2 * | 12/2011 | Reisel et al. | .................. | 188/300 |
| 2006/0113342 A1 * | 6/2006 | Hampton et al. | ............. | 224/409 |
| 2006/0145039 A1 * | 7/2006 | Shawver | ..................... | 248/309.1 |

FOREIGN PATENT DOCUMENTS

JP    11198732 A  *  7/1999

* cited by examiner

*Primary Examiner* — Alfred J Wujciak
(74) *Attorney, Agent, or Firm* — Keith E. Taber

(57) ABSTRACT

An improved mounting mechanism for mounting and holding electronic and other devices in vehicles which increases safety in a vehicular and improves the ability of an operator to incorporate the captured device in their instrument scan. In one embodiment, the improved mounting mechanism captures a device and holds it in a housing using mounting holes located or attached to a panel while allowing for easy removal of the portable device, efficient cable capture, and proper viewing angles. Another embodiment provides an alternate mounting scheme for attaching to an instrument panel.

4 Claims, 5 Drawing Sheets

MOUNTING DEVICE FOR USE WITH PORTABLE ELECTRONIC INSTRUMENTS

PRIORITY

Priority is claimed from Provisional Application Ser. No. 60/701,689, filed Jul. 22, 2005

FIELD OF THE INVENTION

The invention relates to mounting devices, and more particularly to devices for mounting portable electronic devices in vehicles, aircraft and other means of transportation.

BACKGROUND OF THE INVENTION

Portable electronic devices are becoming more predominant and the use of such devices is increasingly advantageous to the user. Along with being advantageous on the person, the devices have specialized uses in the home, vehicles, aircraft, and other transportation means for the user. Examples of such devices include but are not limited to cell phones, music players, navigation equipment, two-way radios, entertainment radios, personal digital assistants, and calculators. In the home, some devices are placed in docking stations where information is exchanged with computers. Other devices have the capability to gather data over wireless links such as infrared and radio.

Generally, a handheld device allows the user to transport, retrieve and even gather information. When using a portable device in a casual environment, the user is typically comfortable holding the device. As the environmental situation changes requiring intervention by the user, such as driving a car or flying an airplane, the user becomes burdened by holding the devices.

Several methods have been devised to hold electronic devices depending on the environment. As mentioned previously, docking stations hold devices while in the home. For Personal Digital Assistants, the docking station may be connected to a computer and a charging apparatus. Entertainment devices may have a holder near a sound system where they can be connected to a receiver. When docking stations are used, cables are typically routed and placed in a semi-permanent position because the docking stations are seldom moved. When placed in a vehicle, the user would not normally have a permanent location for the device.

Issues that the user faces in a vehicle include powering devices for extended periods of time, cables to supplementary devices, movement of the device, pressing actuators, and obtaining safe and proper viewing angles. For example, a satellite radio may require connections to an external antenna, a power source, and the vehicle build in sound system. A navigation device such as a Global Positioning System (GPS) receiver also may require an external antenna, power source, and in some cases connection to a display device. Additionally, navigation equipment in airplanes and boats may have connections to steering and other equipment.

Systems have been devised to capture portable equipment such as disclosed in U.S. Pat. No. 5,626,320, to Burrell. The Burrell solution provides a mount on an aircraft yoke and includes an adjustment to facilitate proper viewing angle. Burrell discloses an instrument mounting bracket for the control yoke of an aircraft. The mounting bracket includes a main body having a C-shaped configuration which is intended to receive the yoke. Mounted to the main body is a pressure plate which serves in conjunction with the main body to grip the yoke therebetween. The main body also includes a pair of threaded attachment holes, with one hole being normal to the plane of the C-shape and the other being within such plane. Either hole may receive a threaded shaft having an enlarged section. An extension arm which includes a mount for the instrument is provided with a through hole for the threaded shaft. Passing the shaft through the extension arm and tightening it within one of the attachment holes secures the extension arm to the main body, and permits angular adjustment of the arm with respect to the body. The extension arm may thus be positioned such that the instrument mount is located in front of the yoke handles, readily accessible to the user.

Although the Burrell device captures the units, a preferable design would be to incorporate the device into the pilot normal instrument scan and to provide a means to route cables.

SUMMARY OF THE INVENTION

Disclosed herein are methods for improving method of capturing and mounting electronic devices. In addition to providing an improved mounting mechanism, the capture of the device increases safety in vehicular applications and improves the ability of an operator to incorporate the captured device in their instrument scan.

In one embodiment, the apparatus captures a device and holds it in a housing using mounting holes located or attached to a panel while allowing for easy removal of the portable device, efficient cable capture, and proper viewing angles. Another embodiment provides an alternate mounting scheme for attaching to an instrument panel.

DETAILED DESCRIPTION OF A REFERENCED EMBODIMENTS

Figure 1A:
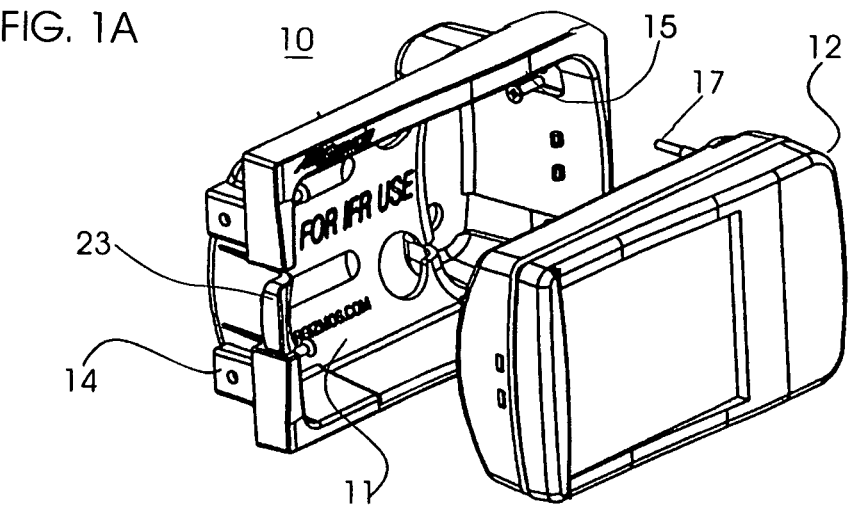
FIGS. 1a-1c illustrate one embodiment of a mounting device for capturing an electronic device, which uses a side or top mounting mechanism to attach as an accessory to an instrument panel.
Figure 1B:
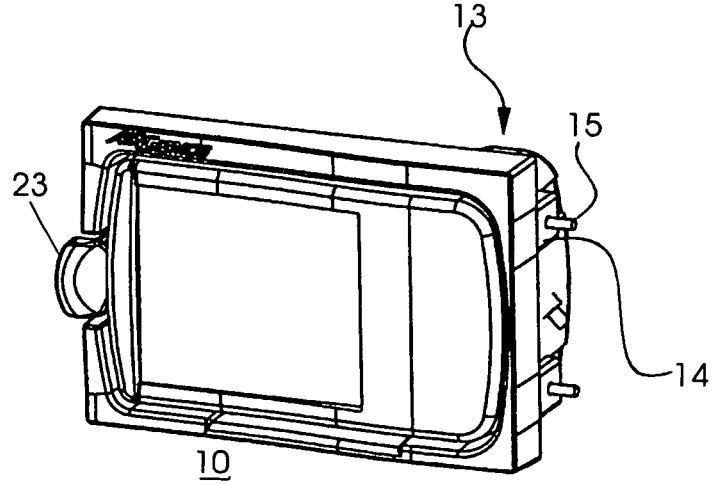
Figure 1C:
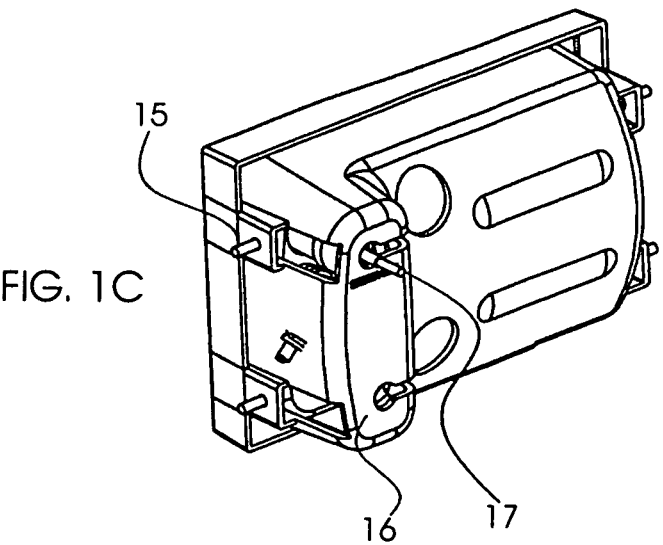

A mounting mechanism 10, shown in FIG. 1a-1c, for a portable instrument, herein referred to as device, discussed previously, consist of a housing 10 which may attach to an instrument panel on a vehicle allowing insertion and removal of the device. The mounting mechanism 10 provides a method for attaching to an instrument panel, a method of removing the electronic device, and a means for capturing and routing cables. An instrument panel described herein generally relates to a surface constructed in a vehicle to provide a mounting location for instruments, displays, and controls. For the purpose of this disclosure, an instrument panel will be used as an example. Installation may be intuitively extended to home cabinets, entertainment centers, equipment rack, or any other points of use for portable devices.

The proposed methods using a housing made from plastic material, and in some embodiments, the housing is attached to metal supports. However, the devices and support mechanisms described may easily be constructed of other materials. In a first embodiment, a mounting mechanism 10 is described made from plastic material and having side mounting screw holes 14a in tabs 14 to facilitate attachment to a previously constructed mounting system or to metal mounting brackets attached to the panel. FIG. 1a illustrates a mounting mechanism 10 and the corresponding electronic device 12. Cavity 11 of the housing 10 is made for a specific product 12, product line using the same form factor, or similar products. The term device is used to denote a particular piece of equipment that is to be captured whereas the term product is used in a more generic sense to refer to devices of a similar form and function. Having the cavity a specific shape allows for better capture of the device.

The capture is important in moving vehicles were external forces can cause poorly secured devices to move and become unseated. Following the device shape also produces a better visual experience in that the mounting device is more pleasing to the viewer. Additionally, the capture creates a consistent viewing angle with all mounted devices in the panel and solves problems with cable routing producing an environment with less clutter.

In the Burrell embodiment discussed earlier, the system had to be adjusted to provide a proper viewing angle and that angle could change if the control yoke was moved from a position to facilitate a turn in the aircraft. When a panel has been preset by the manufacturer such as an airplane instrument panel, then adding the mounting system automatically incorporates the correct viewing angle.

FIG. 1b illustrates a system 10 in which the electronic device 12 is captured by the mounting mechanism 10. To attach the mounting mechanism 10 into a panel (not illustrated) or other mounting structure, tabs 14 are provided to allow connection to the panel or a support structure attached to the panel using fasteners 15. Device 12 may be retained in mounting mechanism by a spring loaded or flexible tab 23. To release and remove device 12 from mounting mechanism 10, retaining mechanism 23 is flexed away from device 12.

The support structure may be the side of an available instrument slot that has been fabricated for the panel. Angled attachment pieces may be part of the support structure and used as a connection means between the panel and the mounting device. For example, one side of a 90 degree angle piece would attach to the instrument panel and the other perpendicular angle would be attached to the mounting housing by using attachment devices 15, including but not limited to screws, bolts, rivets or other hardware.

Some electronic devices are self contained and do not need external power or other connections. For the purpose of this disclosure, devices needing at least a source of power to maintain an ON state for extended use will be used. The embodiment examples serve to convey additional complexities that are solved and the use of wired devices does not limit the scope of the device that can be captured using the systems described.

FIG. 1c illustrates a back view of the mounting device holding the electronic device. A recessed area 16 is provided to hold a cable and provide clearance for the associated connectors and cable 17 while the device is being held. Providing the cable area protects the connectors, facilitates the easy insertion and removal of the device, and reduces cable clutter by having the cables routed behind the panel. Additionally, the cable capture helps prevent connection loss with the device.

Figure 2A:
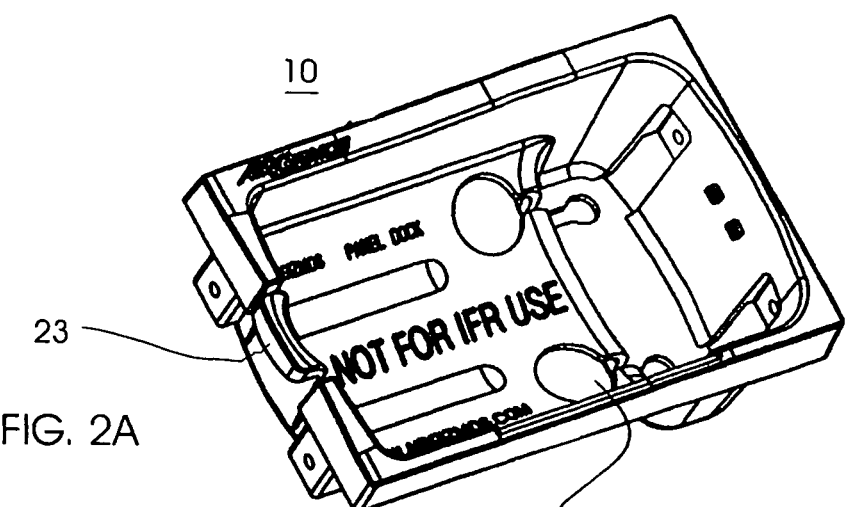
FIGS. 2A-2B illustrate an additional view of the mounting device showing internal features.
Figure 2B:
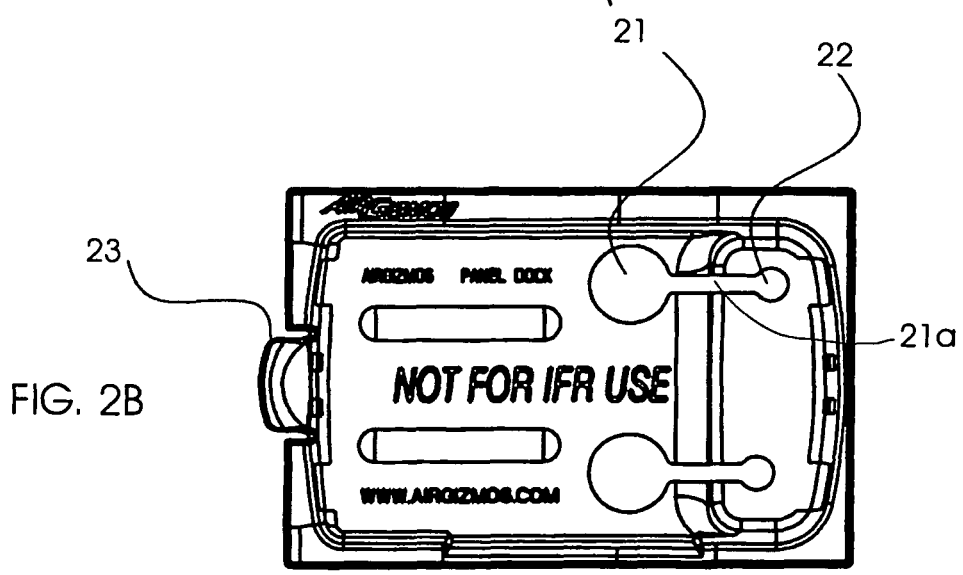

FIGS. 2a-2b illustrate the housing mechanism 10 in additional views showing the internal features. A keyhole 21 is provided within holding mechanism 10 so that a connector and cable 17 may be routed though the mounting device and connected to the device 12 (FIG. 1).

FIG. 2B illustrates the front view of the housing mechanism showing one method of creating a keyhole. The hole that the cable passes is large enough to route the connector and the cable is then allowed to move into the cable resting area 22 which allows for cable movement while keeping the connector from falling back behind the mounting device, and panel when the device is not secured in the mounting device cavity. Although the slot 21a in this embodiment is a straight slot from the connector pass though hole 21 to the cable resting hole 22, the design of the keyhole could be angled, spiral, or other shapes depending on the connector position and designers preferences.

To aid in device capture, a retaining mechanism 23 is used. In this embodiment, the retaining mechanism is utilizing the edge on the electronic device to hold the device in place. A retaining mechanism can also use other structural forms or even friction to hold device 12 in place. The retaining mechanism 23 may be friction fit, tabs, tongue and grove, and other retaining mechanisms apparent to the designer. The retaining mechanism 23 in this embodiment is constructed to move and allow for the removal of the device 12. Once the system 13 is in place, the user is able to use the device 12 like other any instruments mounted in the panel. Having a solid mounting structure in the panel provides a better means for pressing actuators, retaining cables, and as noted previously, a better viewing angle.

In a second embodiment, a capture system of the first embodiment is used with an alternate panel mounting method using a self contained fastening mechanism. Using a fastening mechanism can reduce the complexity of an installation in an instrument panel. In the first embodiment, hardware such as screws and nuts are required to attach the mounting device into the panel. Additional material such as angle brackets may be required if a standard mounting fixture is not preinstalled in the panel.

Figure 3A:
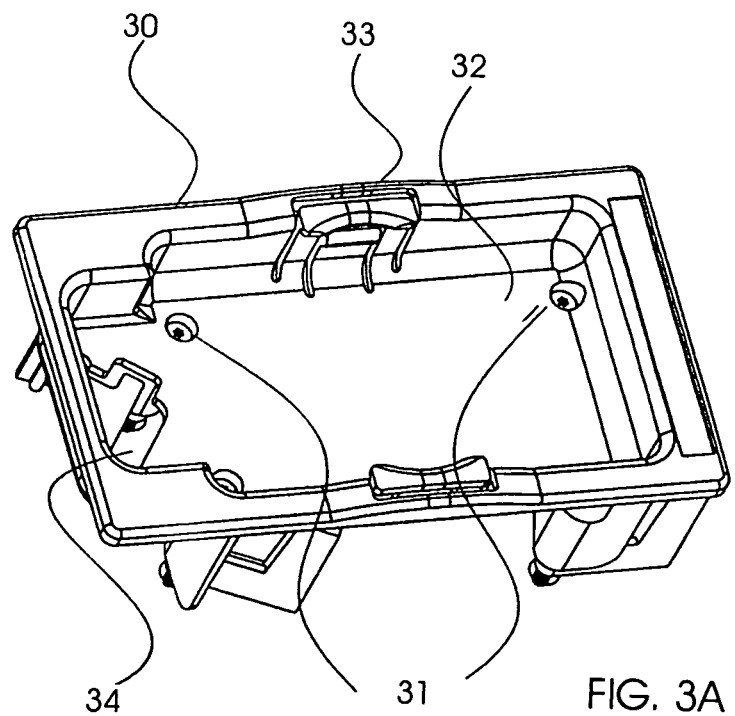
FIGS. 3A-3B illustrate an alternate attachment method for attaching the mounting device to the instrument panel by using a self locking mechanism.
Figure 3B:
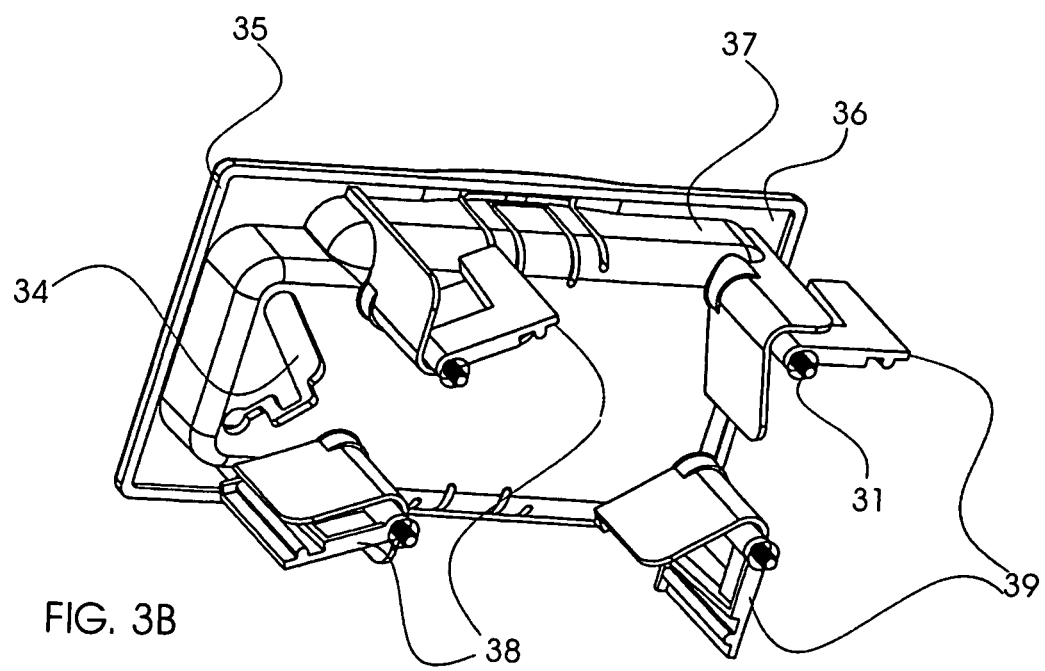

FIGS. 3A-3B illustrate two views of an alternative mounting device 30. FIG. 3A illustrates the front view of the mounting device 30 showing the internal features. In this embodiment, the same internal features of the mounting device such as cavity 32, release mechanism 33, and cable keyholes 34 are found. The connector and cable relief area in this embodiment is located to the side. Electronic devices may have different and multiple connector locations requiring the designer to vary the location of the connector and cable relief areas.

FIG. 3B illustrates the back view of the alternate mounting device showing the mounting elements. A principle difference in the first and second embodiments is that the face plate 35 has an overlap 36 from the cavity wall 37 and the overlap 36 is used as part of a fastening mechanism. The faceplate 35 provides a means to insert the mounting device into a properly sized panel opening and stop the holding fixture from falling though the opening. The opening in the panel or other mounting structure would be sized to allow the cavity to be inserted from the front of the panel into the opening and to be smaller than the faceplate. Rotating wings 38 and 39 are attached to the mounting device by means of screws 31 that are accessible from the cavity (FIG. 3A). Initially, the wings are preset in a position indicated by wings 38 that allows for the housing to be inserted into the properly sized opening. As the screws 31 are moved in the direction to advance the screw, the wing rotates from the preset position 38 to a position as indicated by wings 39 that will capture the panel between the wing and the faceplate. As the screws 39 are tightened, wings 38 and 39 are drawn closer to the faceplate 35, the faceplate contacts the front of the panel and the wings contact the back of the panel where both structures capture and hold onto the panel by compression.

Figure 4:
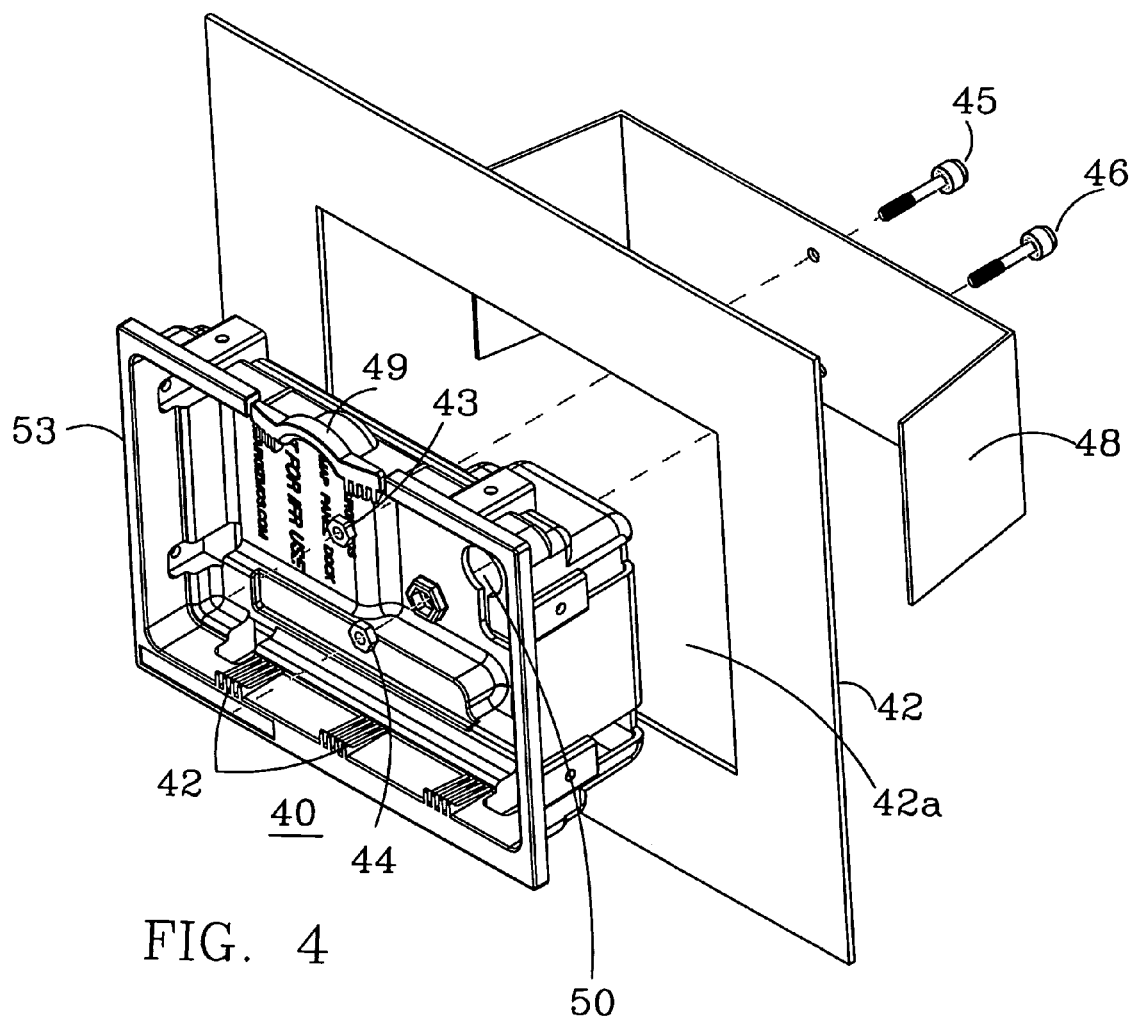
FIG. 4 illustrates a mounting device attached to a panel.

FIG. 4 shows a mounting device 40 that is secured to a mounting panel 42 by a bracket 48 and screws 45 and 46. Mounting device is secured to panel 42, in opening 42a by mounting bracket 48 that is behind panel 42. Screws 45 and 46 extend through bracket 48 and mounting device 40 and are secured to bolts 43 and 44. Flange 53, on mounting device 40 prevents mounting device 40 from passing though opening 42a. An opening 50 allows connections to a device in mounting device 40.

Mounting device 40 has a plurality of fingers 42 to hold a device mounted in mounting device 40. Fingers 42 are one side and additional movable fingers 49 are on an opposite. A device placed in mounting device 40 is securely held in place between the fingers 42 and movable fingers 49.

Figure 5:
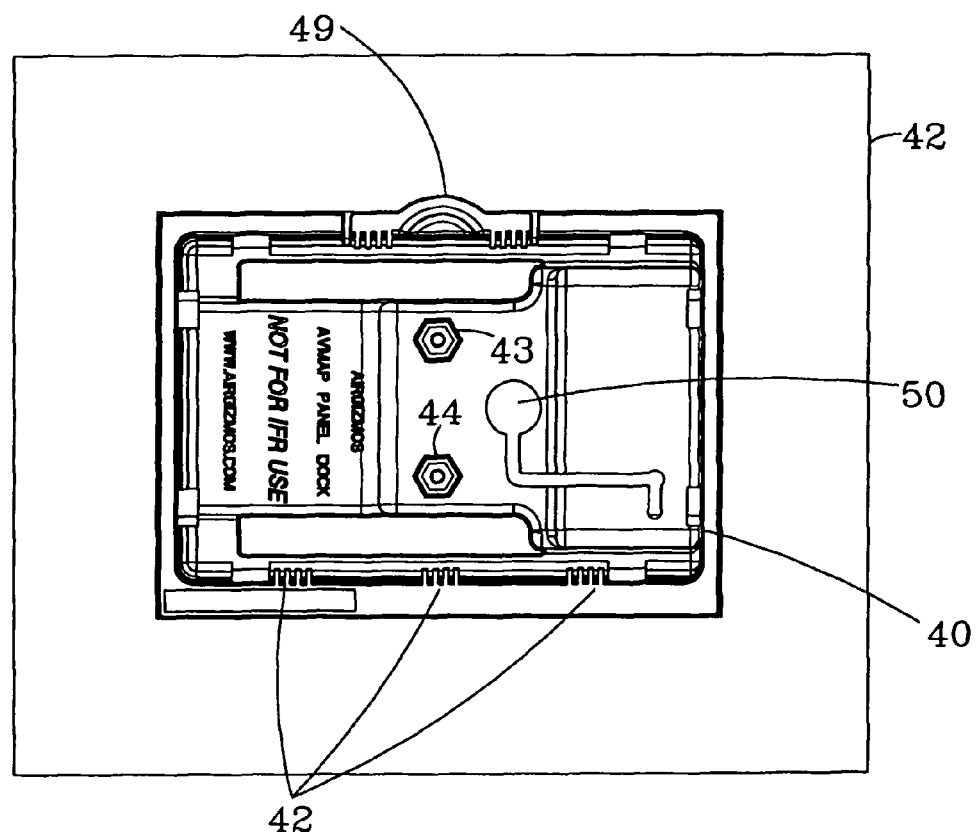
FIG. 5 is a front view of the mounting device attached to a mounting panel.

FIG. 5 is a front view of mounting device 40 showing it secured in panel 42. Connections opening 50 is shown as well as the bolts 43 and 44 that secured mounting device in panel 42. Fingers 42 and moveable fingers 49 are shown on opposites side of mounting device 40.

Figure 6:
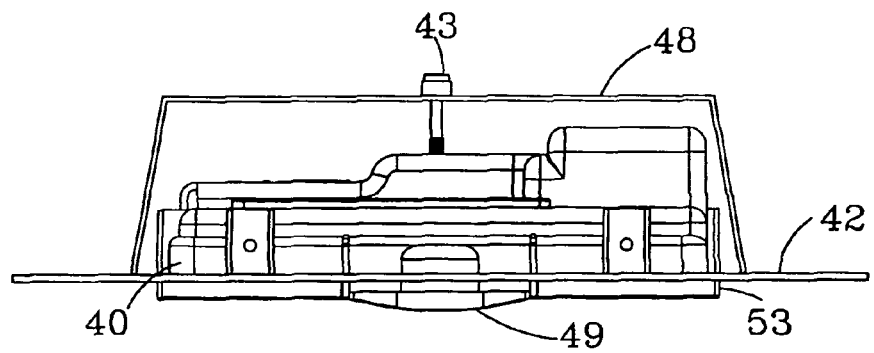
FIG. 6 is a side view of a mounting device attached to a panel.

FIG. 6 is a side view of mounting device 40 mounted in panel 42. Mounting device 40 is shown mounted in panel 42 and is held in place by mounting bracket 48 and screw 43 (screw 44 is not shown).
Movable finger 49 is show slightly extend outward so that is may be pressed to remove a device when mounted in mounting device 40. Flange 53 is shown against panel 42.

While this invention has been described with reference to illustrative embodiments, this description is not intended to be construed as limiting the scope of the invention but as merely illustrating some of the presently preferred embodiments of this invention. It is to be understood that the scope of the invention also comprehends variations and combinations of the embodiments described. Words of inclusion are to be interpreted as non-exhaustive in considering the scope of the invention.

What is claimed is:

1. A mounting device, for mounting a portable electronic instrument within an instrument panel of a vehicle, the mounting device comprising:
    a housing comprising a cavity with a first area having a first depth and a recessed area having a recessed depth that is greater than the first depth; the cavity further comprises:
    a back extending behind the first area and the recessed area;
    wherein the recessed area is operable to hold a connector coupled to a cable that may be routed into the recessed are through the back; and
        wherein the cavity is operable to capture a portable electronic instrument, and
        wherein the mounting device further comprises:
        a retaining mechanism having an engaging position and a disengaging position;
        wherein the retaining mechanism retains the portable electronic instrument in the cavity in the engaging position, and wherein the retaining mechanism releases the portable electronic instrument from the cavity in the disengaging position.

2. The mounting device of claim 1, wherein the retaining mechanism is flexible.

3. The mounting device of claim 2, wherein the retaining mechanism is flexed away from the portable electronic instrument to release the portable electronic instrument in the disengaging position.

4. The mounting device of claim 1, further comprising:
    at least one connector pass through hole located on the back in the first area through which the connector coupled to the cable may be routed through the hack into the cavity.

* * * * *